United States Patent [19]

Carpenter et al.

[11] Patent Number: 5,399,836

[45] Date of Patent: Mar. 21, 1995

[54] WELDING APPARATUS AND METHOD FOR BUTTERING AN END FACE SURROUNDING A CIRCULAR OPENING IN A WORK-PIECE

[75] Inventors: Marvin L. Carpenter, Gulf Breeze; Urban A. Schneider, Pensacola, both of Fla.

[73] Assignee: Westinghouse Electric Corporation, Pittsburgh, Pa.

[21] Appl. No.: 171,507

[22] Filed: Dec. 22, 1993

[51] Int. Cl.$^6$ .............................................. B23K 9/04
[52] U.S. Cl. .......................... 219/125.11; 219/76.12; 219/76.14
[58] Field of Search ............... 219/76.12, 76.14, 76.15, 219/125.11; 228/45

[56] References Cited

U.S. PATENT DOCUMENTS

| | | | |
|---|---|---|---|
| 2,839,663 | 6/1958 | McCollom | 219/76.14 |
| 3,254,192 | 5/1966 | Braucht | 219/76.14 |
| 4,426,565 | 1/1984 | Ruter | 219/124.34 |
| 4,593,849 | 6/1986 | Doering | 228/45 |
| 4,937,427 | 6/1990 | McVicker | 219/125.11 |
| 5,099,098 | 3/1992 | Burgoon | 219/60 |

FOREIGN PATENT DOCUMENTS 874258  8/1961  United Kingdom ........... 219/125.11

OTHER PUBLICATIONS

Engineering Drawings, "CW-7 Circular Welder", Cypress Welding Equipment, Inc., Apr. 7, 1978 (3 pages).

*Primary Examiner*—Clifford C. Shaw

[57] ABSTRACT

An end face of a work-piece having a circular opening is welded upon by apparatus which includes a stationary post mounted by a mounting assembly to the work-piece with its longitudinal axis coincident with the axis of the opening. A rotating assembly includes a sleeve rotatably mounted on the post and supporting a slide extending laterally from the sleeve. A weld head is supported by a carriage which reciprocates along the slide and has a weld electrode extending toward the end face of the work-piece. Rotation of the sleeve and movement of the carriage are coordinated so that a spiral weld pattern with overlapping turns is laid down on the end face. Cooling water and cover gas, as well as electrical power and control signals for GTAW-HW welding are delivered to the rotating assembly through rotating connections on the post.

13 Claims, 7 Drawing Sheets

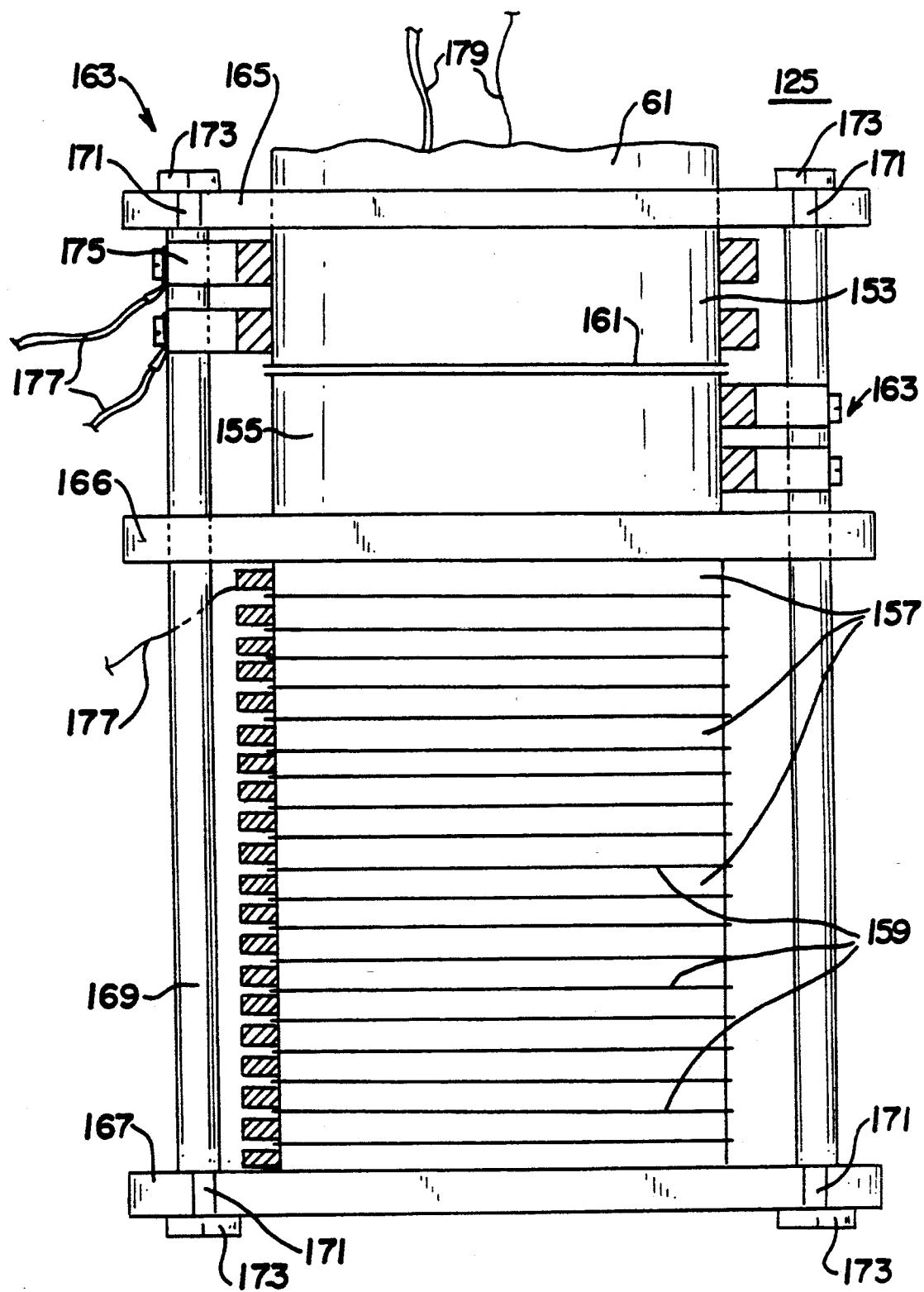
FIG_7

WELDING APPARATUS AND METHOD FOR BUTTERING AN END FACE SURROUNDING A CIRCULAR OPENING IN A WORK-PIECE

BACKGROUND OF THE INVENTION

1. Field of the Invention

This invention relates to welding apparatus and a method for welding on an end face of a work-piece with a circular opening and in particular to such welding apparatus which is mounted onto the end of the work-piece and rotates about the projected axis of the opening to generate a spiral weld bead. The invention has particular application to such apparatus and method which utilizes gas tungsten arc welding—hot wire welding equipment with an arrangement for connecting electrical, gas and cooling water leads and conduits to the rotating equipment.

2. Background of Information

There are situations where it is necessary to apply a coating of weld material, often referred to as "buttering", to a work-piece for welding to another work-piece. At times, it can be very awkward to apply such a weld. For instance, such a weld is used on a steam generator in a nuclear power plant. The large stainless steel piping running from the nuclear reactor is welded to the steam generator at a channel head nozzle. Since the steam generator is manufactured primarily from low alloy steel, the nozzle face must be buttered with a non-ferrous material to provide a weldable interface to the piping.

Current practice is to butter the low alloy steel nozzle of the steam generator with nickel alloy weld metal and then to weld it to a forged stainless steel safe end. The safe end becomes the interface to the field piping. The gas tungsten arc welding—hot wire process (GTAW-HW) is used because of its good deposition rate, stable arc characteristics, and high quality weld deposits using nickel alloy filler metals. Typically, the nozzles have been buttered using existing GTAW-HW equipment mounted on a large manipulator. The steam generator channel head is semi-spherical with the nozzle positioned asymmetrically. The channel head is mounted on a welding positioner with the nozzle facing upward and rotated about the central axis of the nozzle. This places the nozzle about 20 feet above floor level. The welder is supported above the rotating nozzle. This procedure results in long set-up times, welding operator discomfort, and weld concentricity problems. Only manual adjustments are available for regulating travel speed and weld bead spacing to compensate for radius changes. Both the speed and bead placement are readjusted for the next bead at the end of each rotation. These adjustments result in numerous starts and stops within the weld deposit. The resulting weld quality of the typically 10 bead wide by 14 layer high deposit is less than process capabilities.

There is a need for an approved apparatus and method for buttering the end faces of parts having circular openings such as the nozzles on steam generator channel heads.

In particular, there is a need for such apparatus and method which can make continuous welds of this type.

There is a further need for such apparatus and method which produces a continuous weld which is concentric with the opening.

There is also a need for such apparatus and method which uses the GTAW-HW process and accommodates the numerous conduits and electrical leads needed for that process.

SUMMARY OF THE INVENTION

These needs and others are satisfied by the invention which is directed to apparatus and a method for buttering an end face surrounding a circular opening in a work-piece in which the welding means is supported for coordinated rotation about, and radial translation relative to, an axis concentric with the central axis of the opening to lay down a continuous spiral weld bead with a selected overlap of successive turns of the spiral weld bead. The invention further includes an arrangement whereby the electrical leads, and the cover gas and cooling water conduits can be connected to the rotating welding means.

More particularly, the invention comprises a mounting assembly secured to the end of the work-piece. A post is mounted on the mounting assembly with its longitudinal axis generally coincident with the central axis of the circular opening. A rotatable assembly has an elongated support extending from and rotatable about the post. A carriage reciprocally moveable along the elongated support supports the welding means which has an electrode extending toward the end face of the workpiece. Rotating fluid conduits for the cover gas and cooling water and rotating electrical leads are connected to the welding means, and through a rotating connection means on the post to stationary fluid conduits and stationary electrical leads. A control means coordinates rotation of the rotatable assembly about the post, and movement of the carriage along the elongated support to lay down a weld bead on the end face of the work-piece in a desired pattern, preferably a continuous spiral pattern for each layer.

BRIEF DESCRIPTION OF THE DRAWINGS

A full understanding of the invention can be gained from the following description of the preferred embodiments when read in conjunction with the accompanying drawings in which:

FIG. 7 is a side view of a slip ring assembly which forms part of the apparatus of FIGS. 2-4.

DESCRIPTION OF THE PREFERRED EMBODIMENT

Figure 1:
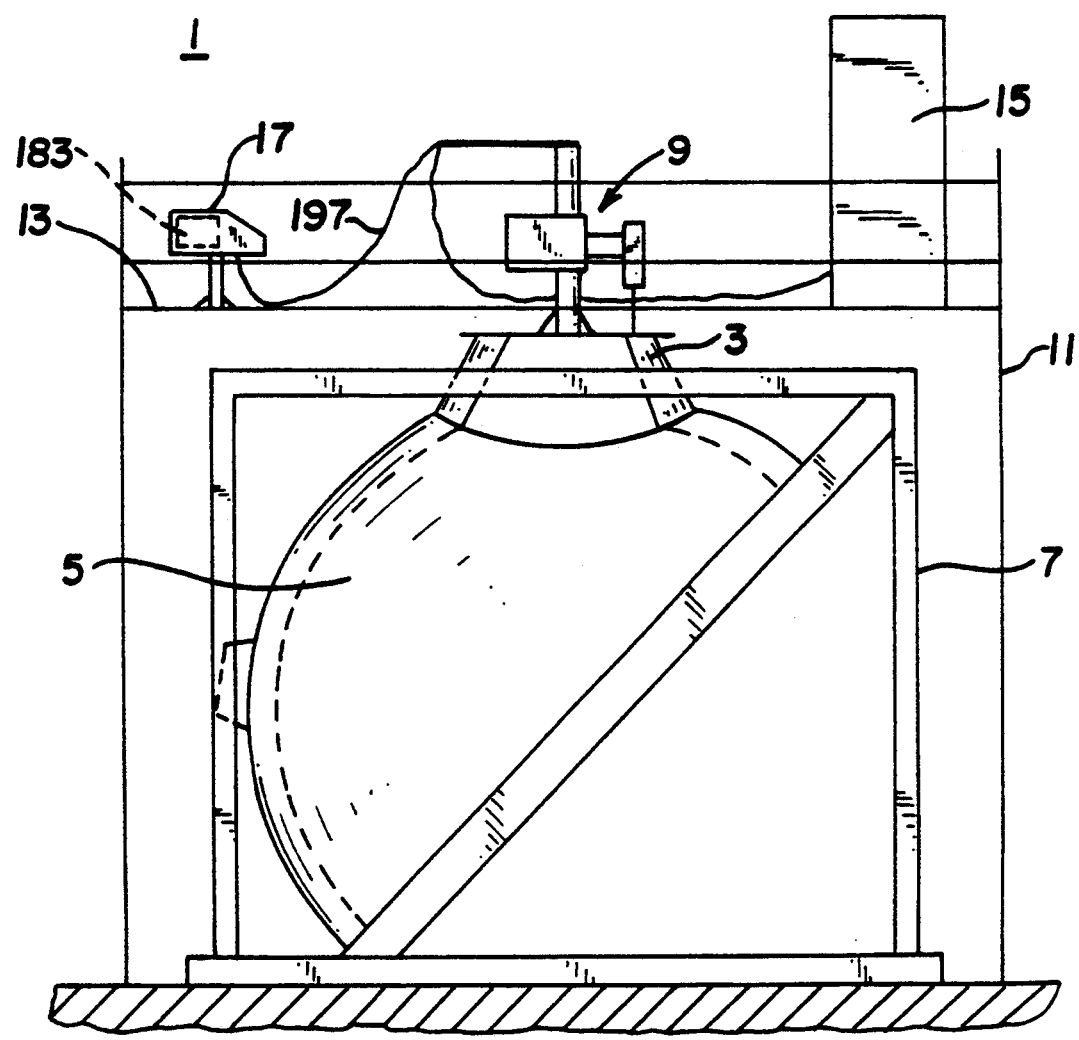
FIG. 1 is an elevation view of a set-up in accordance with the invention for welding on the nozzle of a steam generator channel head.
Figure 2:
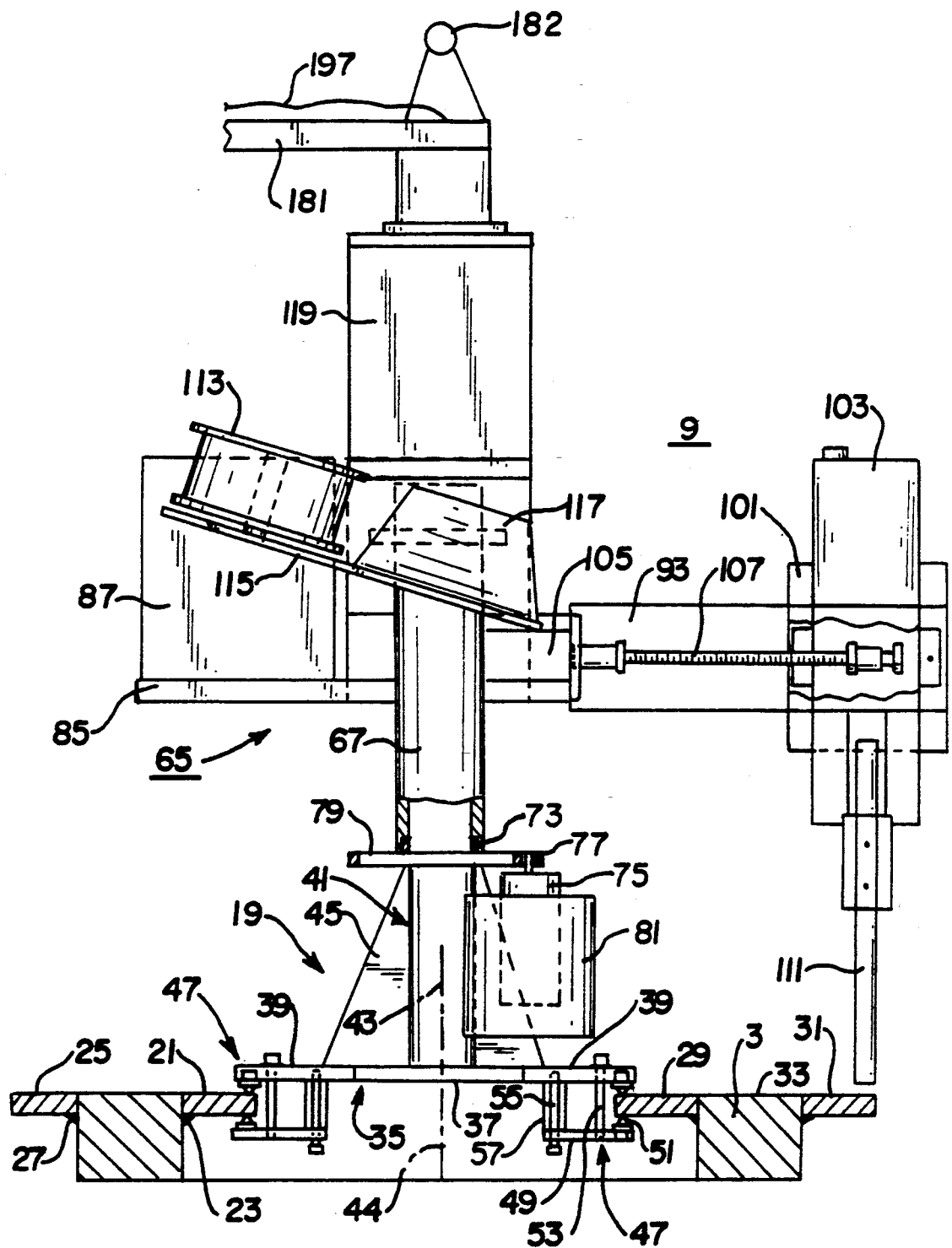
FIG. 2 is a front elevation view of the apparatus in the set-up of FIG. 1 for welding on the channel head.
Figure 3:
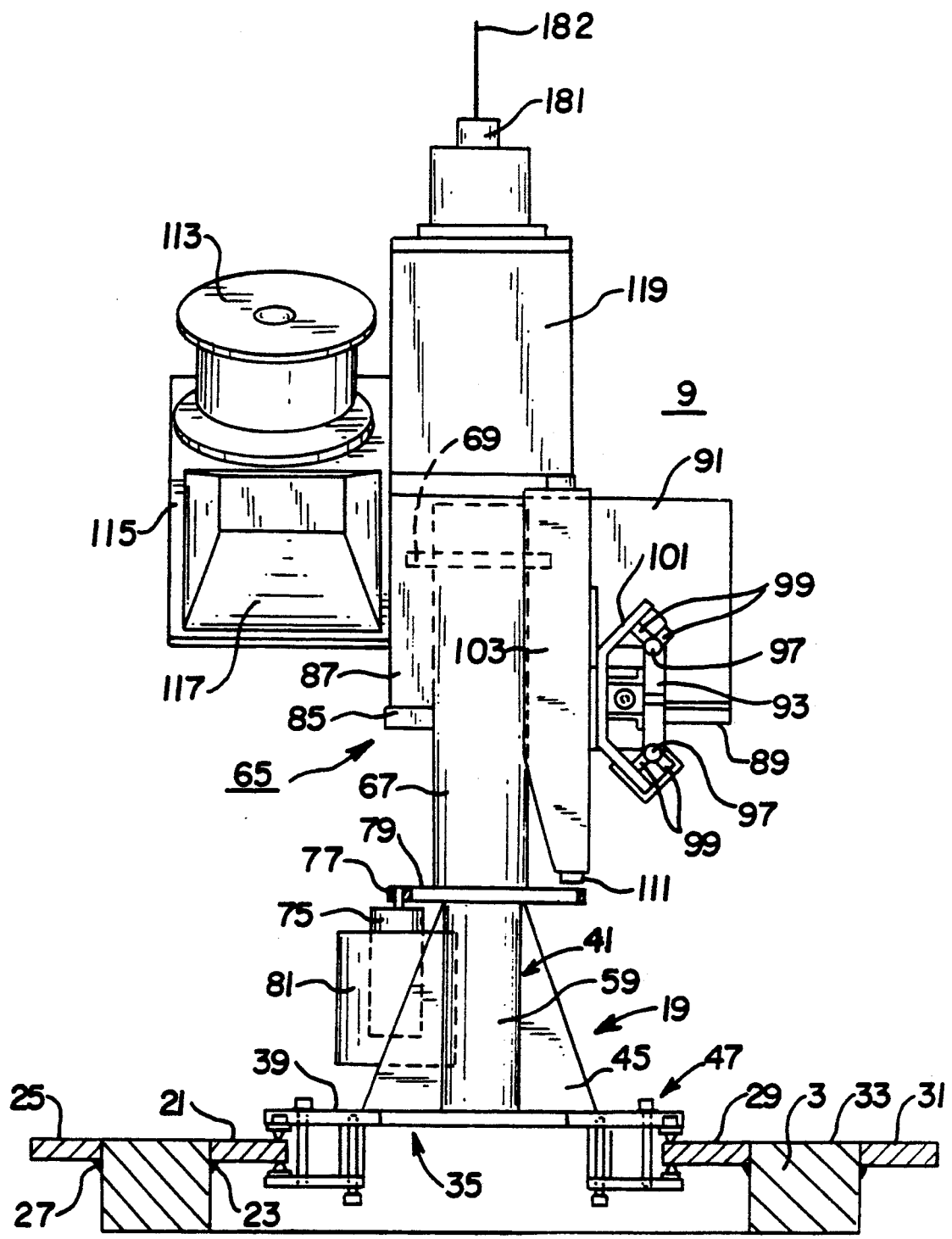
FIG. 3 is elevation view of the apparatus looking in at the right side as shown in FIG. 2.
Figure 4:
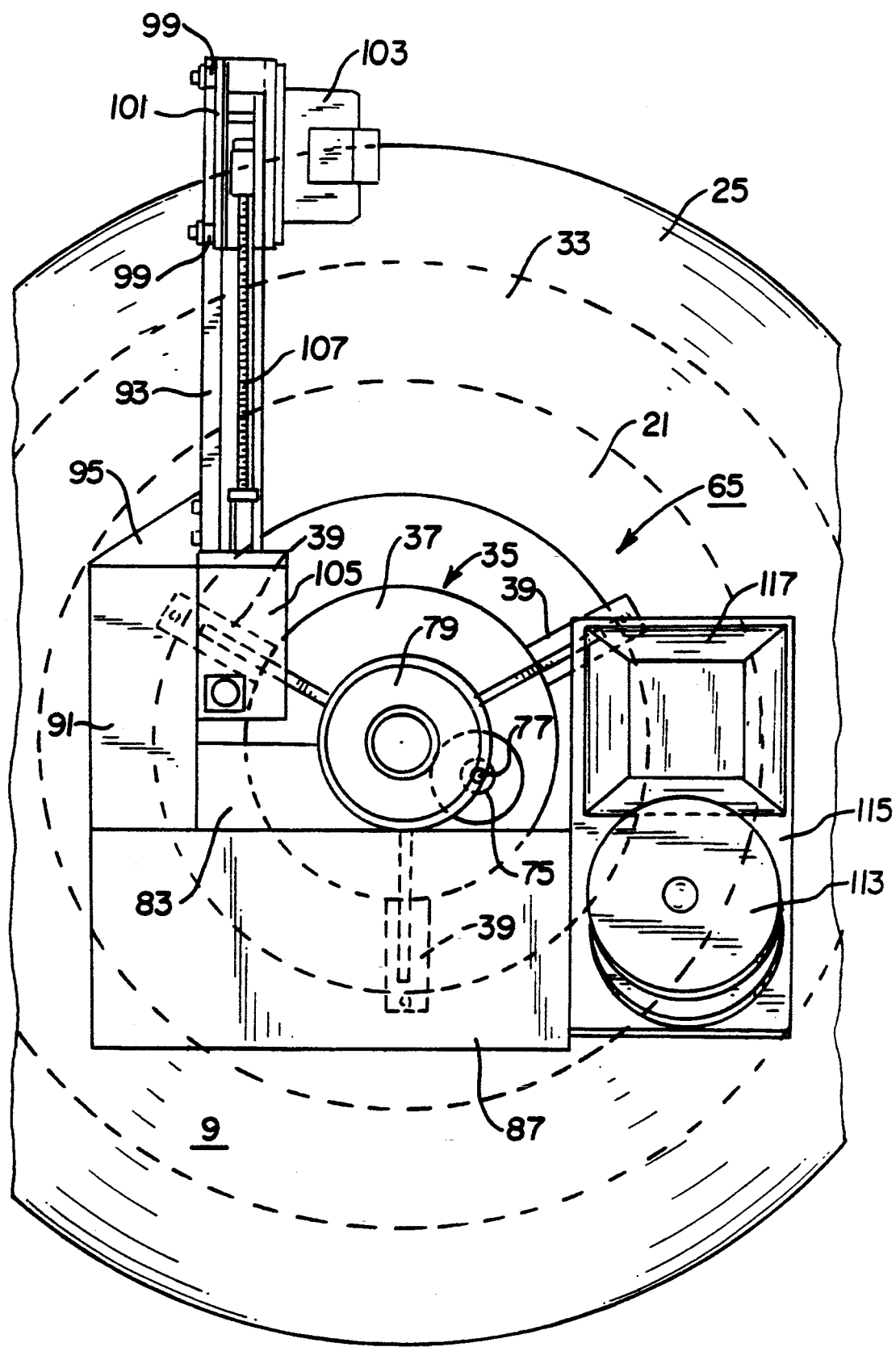
FIG. 4 is a top plan view, with some parts removed, of the apparatus.

FIG. 1 illustrates a set-up 1 for performing a weld in accordance with the invention on a nozzle 3 of a channel head 5 of a steam generator for a nuclear power plant. Those skilled in the art will readily recognize the applicability of the invention to welding other types of work-pieces.

The set-up 1 includes a frame 7 which supports the hemispherical channel head 5 with the nozzle 3, which is offset from the central axis of the channel head, facing upward. The welding apparatus 9 in accordance with the invention is mounted directly to the nozzle 3 in the manner to be discussed. A stand 11 positioned over the frame 7 supporting the channel head has a platform 13 which supports a power cabinet 15 and control console 17 while also providing easy access to the welding apparatus by an operator.

Referring now to FIGS. 2–5, the welding apparatus 9 incorporates a mounting assembly 19 mounting the apparatus to the nozzle 3. The mounting assembly 19 incorporates an inner run-off ring 21 which is tack welded at 23 to the inner diameter of the nozzle 3. A second, larger run-off ring 25 is tack welded at 27 to the outer diameter of the nozzle 3. The upper surfaces 29 and 31 of the rings 21 and 25, respectively, are co-planner with the end face 33 of the nozzle 3 which is to be buttered.

The mounting assembly 19 includes a base plate 35, which in the exemplary apparatus, has a central circular section 37 with three radially outwardly extending legs 39 spaced 120° apart. A post 41 is centrally mounted on the base plate 35 with its longitudinal axis 43 perpendicular to the plane of the plate 35, and generally coincident with the central axis 44 of the nozzle 3. The post 41 is braced by three triangular gussets 45 aligned with the legs 39.

The base plate 35 is clamped to the inner ring 21 by clamps 47 which include the legs 39 and jaw plates 49 having confronting cone shaped teeth 51 which engage opposite surfaces of the ring 21. A pair of clamping bolts 53 and 55 draw the legs 39 and jaw plates 49 toward each other. A sleeve 57 on the bolt 55 fixes the distance between the inner ends of the jaw plates 49 and the legs 39 to about the distance between the outer ends when clamping the ring 21.

The post 41 includes a lower tubular section 59 and an upper tubular section 61 each welded to an intermediate section.

Rotatable assembly 65 is rotatably mounted on the post 41. This assembly 65 includes a sleeve 67 with a cap plate 69 rotatably mounted on the post 41 by upper bearings 71 and lower bearings 73. The sleeve 67, and therefore the rotatable assembly 65, are rotated about the post 41 by an electric motor 75 mounted on the mounting assembly 19. A pinion gear 77 on the motor output shaft engages a ring gear 79 secured to the lower end of the sleeve 67. The motor 75 is contained in a water cooled motor protection chamber 81 which protects the motor from heat generated by the welding process.

The welding process used is the gas tungsten arc welding—hot wire process (GTAW-HW). This process requires, among other things, a high frequency starter and cooling for the weld head. The latter is provided by circulation of cooling water through the weld head. In accordance with the exemplary embodiment of the invention, a mounting bracket 83 secured to the sleeve 67 supports a platform 85 for a water cooler 87, and a second platform 89 on which a high frequency start unit 91 is mounted. An elongated support in the form of slide plate 93 secured to the platform 89 by a bracket 95 extends laterally outward from the sleeve 67. The slide 93 has rods 97 extending along top and bottom which are engaged by pairs of rollers 99 on a carriage 101. The carriage 101 supports a weld head 103 and is reciprocally propelled along the slide arm 93 by a motor 105 which turns a lead screw 107 which engages a traveling nut 109 on the carriage 101. As will be discussed later, the motor 105, not only positions the weld head along the slide arm 93 but jitters the carriage to widen the weld bead.

The weld electrode 111 extends downward from the weld head 103 toward the end face 33 of the nozzle 3 to be welded. A reel 113 of weld wire mounted on a bracket 115 is rotated by a wire feed motor 117 to feed weld wire (not shown) toward the electrode 111.

Figure 6:
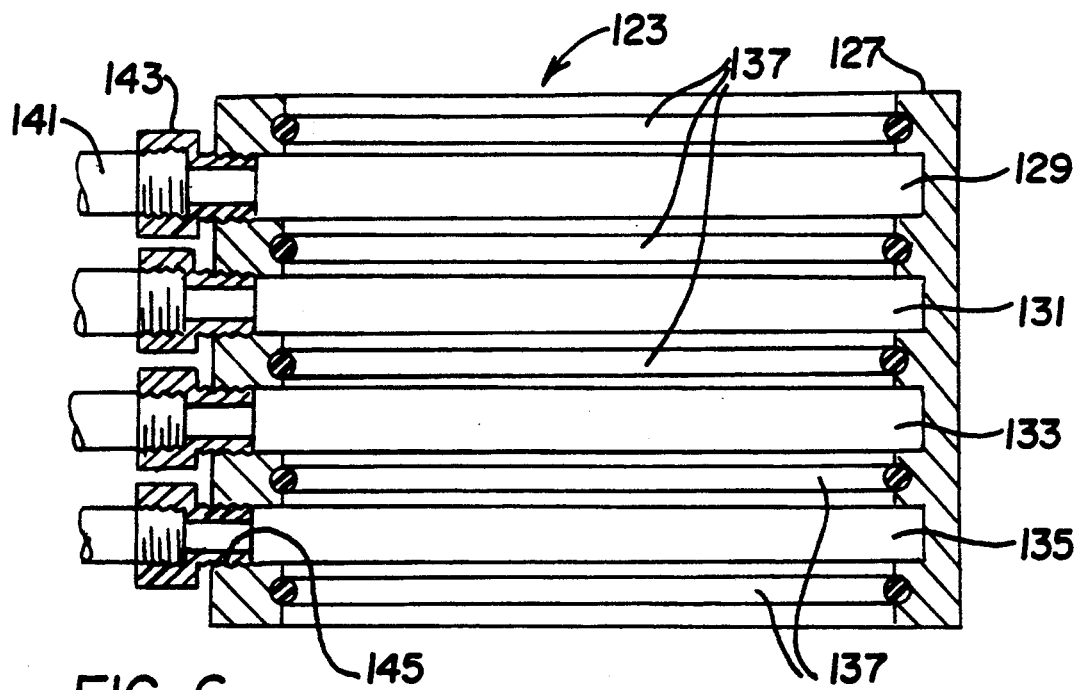
FIG. 6 is a vertical sectional view through a gas coupling shown in FIG. 5.
Figure 5:
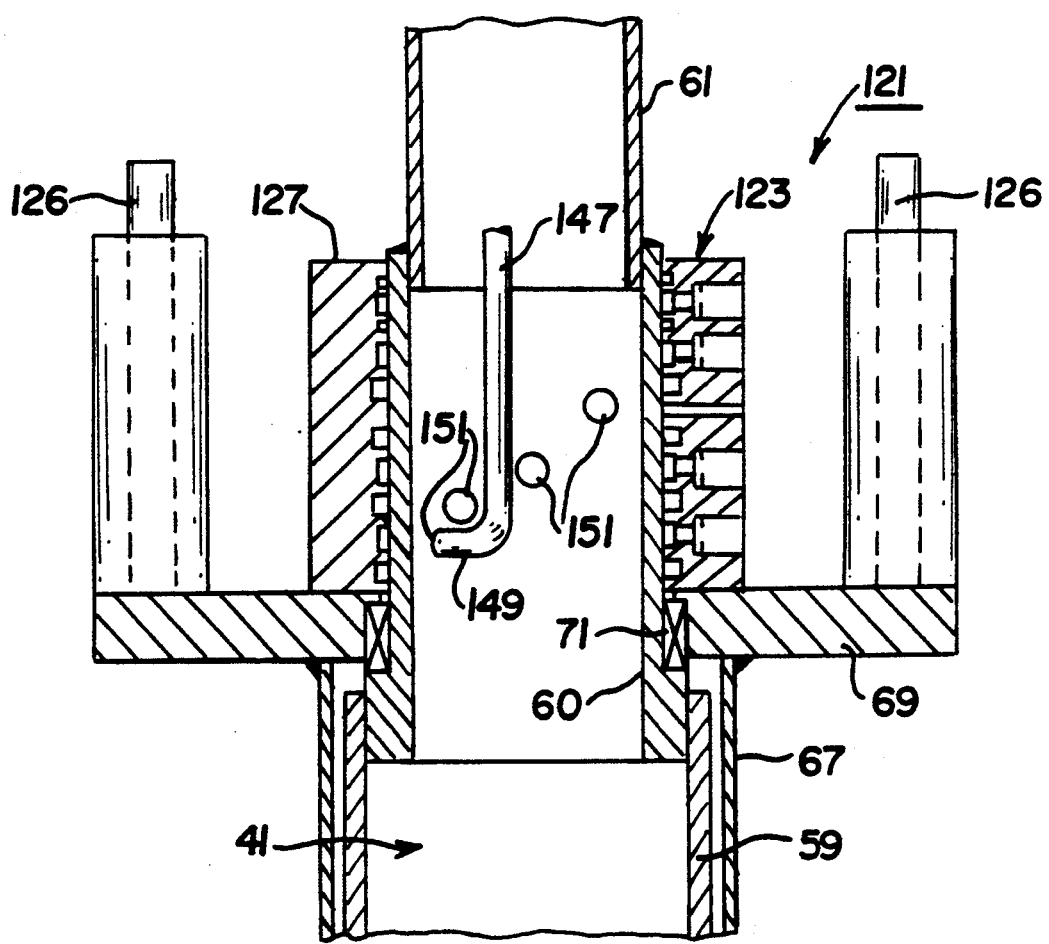
FIG. 5 is a vertical sectional view through a portion of the apparatus shown in FIGS. 2-4.

As mentioned above, the GTAW-HW welding process requires cooling water. In accordance with the invention, this cooling water can be recirculated in a closed loop which includes the water cooler 87, or it can be provided from an external source. In addition, the GTAW-HW process requires a cover or shielding gas which excludes air from the weld zone. Typically, this cover gas is 75% helium and 25% argon. In addition, a trailing gas, typically 100% argon, protects the weld from oxidation until it has cooled sufficiently. Of course, electric power must be provided to the welding apparatus. In the case of the GTAW-HW process this includes dc power for welding. In addition, electric power and control signals must be provided for the various motors and other electrical devices. All of these utilities must be provided to the rotatable assembly 65. As can be seen from FIGS. 5–7, this is accomplished by a rotating connection assembly 121 which includes a fluid coupling 123 and a slip ring assembly 125 covered by housing 119. The fluid coupling 123 includes a collar 127 which rotates with the rotating assembly 65. This collar 127 has four axially spaced angular grooves 129, 131, 133 and 135 on its inner surface. O rings 137 seated in grooves 139 separately seal the angular chambers formed by the grooves 129–135. Rotating conduits 141 are connected to each of the angular chambers formed by the grooves 129–135 by fittings 143 inserted in threaded bores 145 in the grooves 129–135.

Stationary conduits 147 extend inside the upper section 61 of the post and have a radially outwardly directed end section 149 which extends through a bore 151 in the pipe 61 to communicate with one of the angular chambers formed by the grooves 129–135.

The slip ring assembly 125 includes a dc power slip ring 153, an ac power slip ring 155 and a series of smaller slip rings 157 all fixed on the pipe 61. (See FIG. 7). The slip rings 157 are electrically isolated by insulators 159, while a double insulator 161 isolates the dc power slip ring from the ac power slip ring 153. A rotating assembly 163 includes an upper insulator ring 165 above the dc power slip ring 153, a second intermediate insulator ring 166 which rotates between the ac power slip ring 155 and the smaller slip rings 157, and a lower ring 167 below the slip rings 157.

The lower ring 167 is welded to standoffs 126 projecting upward from cap plate 69, and therefore, rotates relative to the slip rings. Several angularly spaced insulator rods 169 extend through the middle insulator ring 166. Threaded studs 171 on each end of the rods 169 extend through the upper and lower insulator rings 165 and 167, and are secured thereto by nuts 173. Spring loaded contact shoes 175 mounted on the rods 169 bear against the slip rings 153–157 and are connected to rotating electrical leads 177 which in turn are connected to the appropriate equipment on the rotating assembly 65. Stationary electrical leads 179 are connected to each of the slip rings inside the pipe 61 and extend out the upper end of the pipe 61. The stationary electrical leads 179 and stationary conduits 147 are supported by a boom 181 extending horizontally from the upper end of the pipe 61. (See FIG. 2). The apparatus 9 is supported for installation and removal by a lift ring 182.

Figure 8:
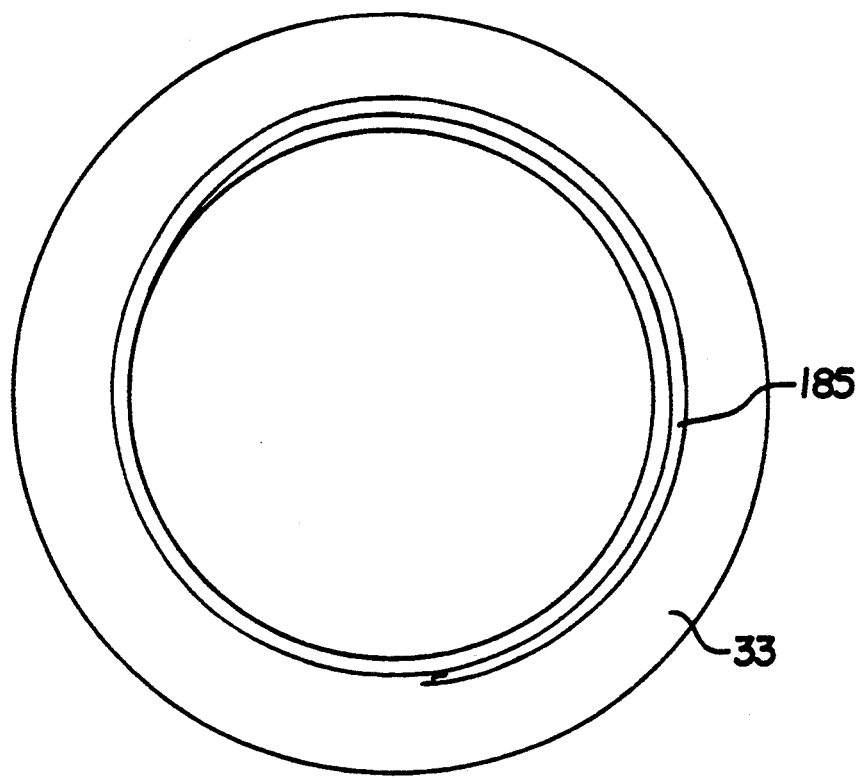
FIG. 8 is a plan view of a partial weld made in accordance with the invention.
Figure 9:
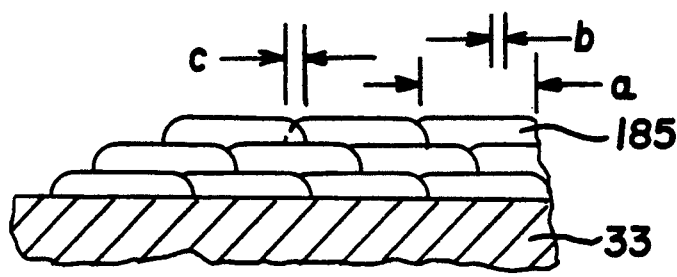
FIG. 9 is a vertical section through a single layer of a weld made in accordance with the invention.

A computer control system 183 operated from the control console 17 controls coordination of the rotation of the rotatable support assembly 65 by the motor 75 and the movement of the carriage 101 along the elongated support or slide 93 by the carriage motor 105 so that a spiral weld bead 185 (see FIG. 8) is applied to the end face 33 of the nozzle 3. As shown in FIG. 9, the motor 105 causes oscillation of the carriage 101 to produce a bead with the width "a" from the welding electrode which has a diameter of "b". As can also be seen in FIG. 9, successive turns of the bead overlap one another by a selected amount "c". In addition, it can be seen that multiple layers of the welding bead are applied to the end face 33.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed:

1. Welding apparatus for buttering an end face surrounding a circular opening in an end of a work-piece, said apparatus comprising:
    a mounting assembly secured to said end of said work-piece;
    a post mounted on said mounting assembly with a longitudinal axis thereof generally coincident with a central axis of said circular opening;
    a rotatable assembly having an elongated support extending from and rotatable about said post;
    a carriage mounted on and reciprocally movable along said elongated support;
    welding means supported by said carriage and having an electrode extending toward said end face of said work-piece;
    rotating fluid conduit means and rotating electrical lead means connected to and rotated with said welding means;
    stationary fluid conduit means and stationary electrical lead means;
    rotating connection means on said post connecting said rotating fluid conduit means to said stationary fluid conduit means and said rotating electrical lead means to said stationary electrical lead means; and
    control means coordinating rotation of said rotatable assembly about said post and movement of said carriage along said elongated support to lay down a desired weld pattern on said end face of said work-piece.

2. The apparatus of claim 1 wherein said control means coordinates rotation of said rotatable assembly about said post and movement of said carriage along said elongated support to lay down said weld bead on said end face of said work-piece in a spiral pattern.

3. The apparatus of claim 2 wherein said control means coordinates rotation of said rotatable assembly about said post and movement of said carriage along said elongated support to lay down said weld bead on said end face of said work-piece in a spiral pattern with a selected amount of overlap of successive turns of said weld bead.

4. The apparatus of claim 1 wherein said welding means comprises gas tungsten arc welding equipment and wherein said rotating and stationary fluid conduit means comprise rotating and stationary cover gas conduit means.

5. The apparatus of claim 4 wherein said welding means comprises gas tungsten arc welding—hot wire equipment having wire feed means carried by said rotatable assembly.

6. The apparatus of claim 4 wherein said rotating and stationary fluid conduit means further comprise rotating and stationary cooling water conduit means.

7. The apparatus of claim 6 wherein said stationary conduit means have longitudinal sections extending generally parallel to said longitudinal axis of said post and transverse sections extending generally transverse to said longitudinal axis of said post, and wherein said rotating connection means comprises a coupling rotatable about said post and forming annular chambers each communicating with the transverse section of one of said stationary conduit means throughout rotation of said coupling, said rotating fluid conduit means each being connected to and associated one of said annular chambers.

8. The apparatus of claim 7 wherein said rotating connection means further comprises stationary members on said post connected to said stationary electrical lead means and rotating members connected to said rotating electrical lead means, said stationary members and rotating members remaining in electrical contact throughout rotation of said rotating electrical lead means.

9. The apparatus of claim 8 wherein one of said stationary members and rotating members comprises slip rings and the other comprises contact brushes.

10. The apparatus of claim 9 wherein said control means coordinates rotation of said rotatable assembly about said post and movement of said carriage along said elongated support to lay down a weld bead on said end face of said work-piece in a spiral pattern with a selected overlap between successive turns of said weld bead.

11. The apparatus of claim 4 wherein said stationary cover gas conduit means has a longitudinal section extending generally parallel to said longitudinal axis of said post and a transverse section extending generally transverse to said longitudinal axis of said post, and wherein said rotating connection means comprises a coupling rotatable about said post and forming an annular chamber communicating with said transverse section of said stationary cover gas conduit means throughout rotation of said coupling, said rotating cover gas conduit means being connected to said annual chamber.

12. The apparatus of claim 1 wherein said mounting assembly comprises a ring member having an end face and secured to said end of said work-piece with said end face of said ring member generally parallel to said end face of said work-piece, a base plate, and clamping means clamping said base plate to said ring member, said post being mounted on said base plate.

13. The apparatus of claim 12 wherein said clamping means is adjustable to align said longitudinal axis of said post generally coincident with said central axis of said circular opening.

* * * * *